(12) United States Patent
Wei

(10) Patent No.: US 12,340,607 B2
(45) Date of Patent: Jun. 24, 2025

(54) METHOD AND APPARATUS FOR FORM IDENTIFICATION AND REGISTRATION

(71) Applicant: KONICA MINOLTA BUSINESS SOLUTIONS U.S.A., INC., Foster City, CA (US)

(72) Inventor: Junchao Wei, San Mateo, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 294 days.

(21) Appl. No.: 17/958,262

(22) Filed: Sep. 30, 2022

(65) Prior Publication Data

US 2024/0112483 A1   Apr. 4, 2024

(51) Int. Cl.
*G06V 30/19* (2022.01)
*G06V 30/412* (2022.01)

(52) U.S. Cl.
CPC .... *G06V 30/19147* (2022.01); *G06V 30/1916* (2022.01); *G06V 30/412* (2022.01)

(58) Field of Classification Search
None
See application file for complete search history.

(56) References Cited

U.S. PATENT DOCUMENTS

| | | | | |
|---|---|---|---|---|
| 4,392,197 A * | 7/1983 | Couper | G06F 40/166 | 715/269 |
| 6,002,797 A * | 12/1999 | Mori | G06V 20/62 | 382/199 |
| 6,751,779 B1 * | 6/2004 | Kurosawa | G06V 30/414 | 715/255 |
| 2003/0085910 A1 * | 5/2003 | Noble | G09B 29/106 | 345/660 |
| 2005/0201620 A1 * | 9/2005 | Kanamoto | G06V 30/1429 | 382/176 |
| 2005/0278378 A1 * | 12/2005 | Frank | G06F 16/313 | 707/E17.084 |

(Continued)

OTHER PUBLICATIONS

Ousirimaneechai, Nattapong, and Sukree Sinthupinyo. "Extraction of trend keywords and stop words from thai facebook pages using character n-grams." International Journal of Machine Learning and Computing 8.6 (2018): 589-594. (Year: 2018).*

(Continued)

*Primary Examiner* — Michelle M Entezari Hausmann
(74) *Attorney, Agent, or Firm* — SQUIRE PATTON BOGGS (US) LLP

(57) ABSTRACT

Aspects of the present invention relate to a machine learning system that is trained to identify forms, performing a method that includes receiving a form as an input image; identifying a field in the input image; identifying boundaries of the field; identifying locations of characters in the field; creating a two-dimensional space containing special characters; replacing the special characters with the characters in the field; identifying one or more keywords in the field based on identification of words and/or location of words; and responsive to an indication that the identifying one or more keywords yielded an incorrect result, updating the machine learning system. In another aspect, the machine learning system is used to identify forms, and can identify whether a form requires registration and, if registration is required, performing the registration.

15 Claims, 10 Drawing Sheets

(56) References Cited

U.S. PATENT DOCUMENTS

| | | | | |
|---|---|---|---|---|
| 2006/0271887 | A1* | 11/2006 | Bier | G06F 16/9577 715/866 |
| 2008/0188280 | A1* | 8/2008 | Marks | G07F 17/34 463/20 |
| 2010/0275113 | A1* | 10/2010 | Bastos dos Santos | G06F 40/174 715/227 |
| 2012/0136646 | A1* | 5/2012 | Kraenzel | G06F 40/51 704/2 |
| 2014/0207479 | A1* | 7/2014 | Noland | G06Q 40/08 705/2 |
| 2017/0308557 | A1* | 10/2017 | Cassidy | G06N 20/00 |
| 2018/0113858 | A1* | 4/2018 | Peng | G06F 9/454 |
| 2020/0285558 | A1* | 9/2020 | Kalia | G06F 40/211 |
| 2022/0318492 | A1* | 10/2022 | Gohari | G06F 40/194 |
| 2023/0114965 | A1* | 4/2023 | Ferreira | G06F 16/355 707/737 |

OTHER PUBLICATIONS

Jiang, Jing, and ChengXiang Zhai. "An empirical study of tokenization strategies for biomedical information retrieval." Information Retrieval 10 (2007): 341-363. (Year: 2007).*

Shreda, Qais A., and Abualsoud A. Hanani. "Identifying non-functional requirements from unconstrained documents using natural language processing and machine learning approaches." IEEE Access (2021). (Year: 2021).*

Sharif O, Hoque M M, Kayes AS, Nowrozy R, Sarker IH. Detecting suspicious texts using machine learning techniques. Applied Sciences. Sep. 18, 2020;10(18):6527. (Year: 2020).*

Kumar, Rajesh, et al. "A Supervised Method to Find the Relevance of Extracted Keywords Using Deep Learning Approaches." Emerging Technologies in Data Mining and Information Security: Proceedings of IEMIS 2018, vol. 3. Springer Singapore, 2019. (Year: 2019).*

Kadhim, Ammar Ismael, Yu-N. Cheah, and Nurul Hashimah Ahamed. "Text document preprocessing and dimension reduction techniques for text document clustering." 2014 4th international conference on artificial intelligence with applications in engineering and technology. IEEE, 2014. (Year: 2014).*

Marmolejos, Licelot, et al. "On the use of textual feature extraction techniques to support the automated detection of refactoring documentation." Innovations in Systems and Software Engineering (2022): 1-17. (Year: 2022).*

Polato, Mirko, et al. "Efficient Multilingual Deep Learning Model for Keyword Categorization." 2021 IEEE Symposium Series on Computational Intelligence (SSCI). IEEE, 2021. (Year: 2021).*

* cited by examiner

METHOD AND APPARATUS FOR FORM IDENTIFICATION AND REGISTRATION

FIELD OF THE INVENTION

Aspects of the present invention relate to image processing, and more particularly, to forms processing.

BACKGROUND OF THE INVENTION

In the field of document and form analysis, form matching and registration, including content location, are important. Some approaches employ multi-scaling and rotation (and/or image subset matching) to match keywords. However, such techniques make direct template matching difficult. Other approaches employ a multi-modality technique using semantic information. Such techniques require multiple stages, and are correspondingly complicated.

SUMMARY OF THE INVENTION

In view of the foregoing, aspects of the present invention maintain spatial information such as text positions from a two-dimensional (2D) image space while injecting semantic information from extracted optical or image character recognition (OICR) data. This approach is more efficient for finding the relationship of keywords within or between fields throughout a document. The image quality of forms does not affect the efficacy of the technique. As a result, issues such as scan noise (such as color degradation or OICR errors), and scaling or rotation (and/or image subset matching) in the image space do not affect the efficacy of the technique.

BRIEF DESCRIPTION OF THE DRAWINGS

Aspects of the invention now will be described with reference to embodiments as illustrated in the accompanying drawings, in which.

DETAILED DESCRIPTION OF EMBODIMENTS

Figure 1:
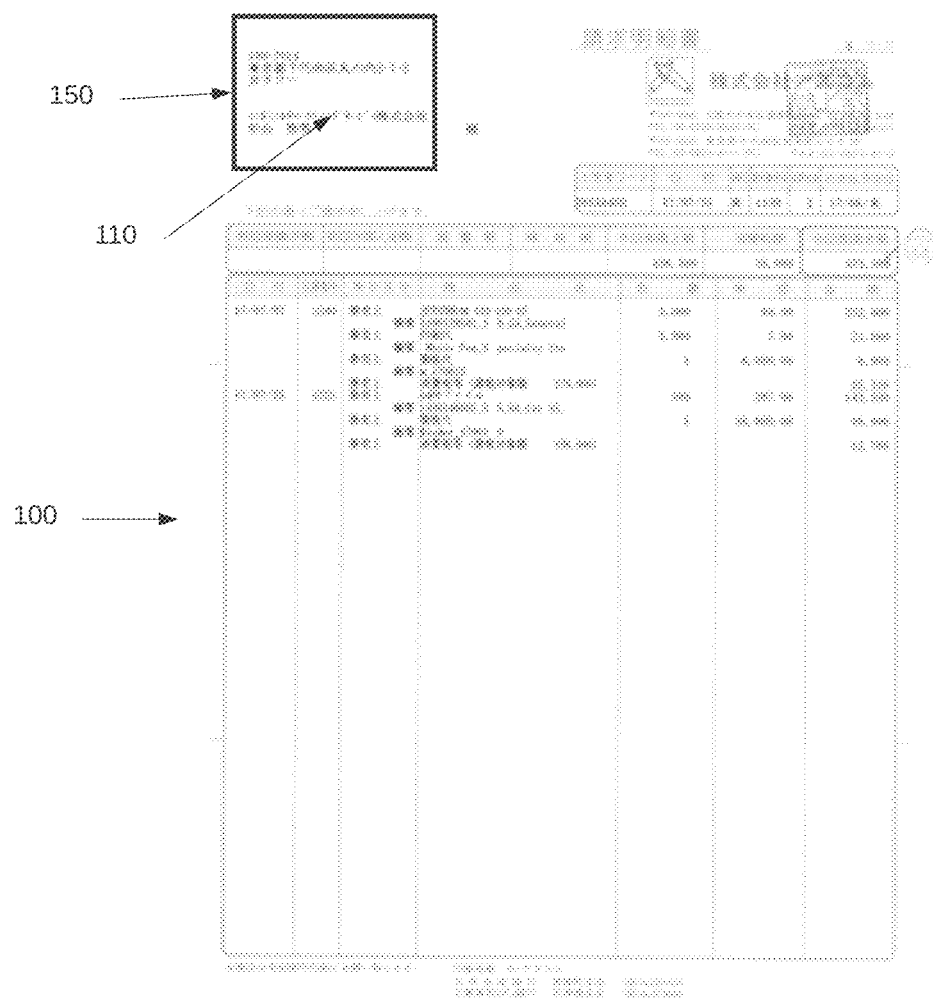
FIG. 1 shows a form with a highlighted field.

In the following description, OCR may refer alternatively or collectively to optical character recognition or image character recognition.

Aspects of the present invention provide a computer-implemented method of training a machine learning system to identify forms, the method comprising: receiving a form as an input image; identifying a field in the input image; identifying boundaries of the field; identifying locations of characters in the field; creating a two-dimensional space containing special characters; replacing the special characters with the characters in the field; identifying one or more keywords in the field based on identification of words and/or location of words; and responsive to an indication that the identifying one or more keywords yielded an incorrect result, updating the machine learning system. In other aspects, updating the machine learning system comprises updating weights of nodes in the machine learning system. In still other aspects, the input image comprises a synthetic form or an image of a scanned form. In further aspects, the identifying one or more keywords comprises reading the characters in the input image. In still further aspects, the identifying one or more keywords comprises using relative locations of characters in the 2D space to determine the one or more keywords. In yet still further aspects, the special characters are distinguished from the other characters in the field by being different from the other characters in the field.

Other aspects of the invention provide a computer-implemented method of using a machine learning system to identify forms, the method comprising: receiving a form as an input image; identifying a field in the input image; identifying boundaries of the field; identifying locations of characters in the field; placing the characters in a two-dimensional space in a position corresponding to locations of the characters in the field; placing special characters in the field where no character is located; identifying one or more keywords in the field based on identification of words and/or location of words; responsive to the identifying the one or more keywords, determining a type of the form; responsive to an indication that the identifying one or more keywords yielded an incorrect result, updating the machine learning system; and responsive to the determining the type of form, determining whether the form requires registration. In other aspects, the method further comprises, responsive to a determination that the form requires registration, performing registration on the form. In still other aspects, the identifying one or more keywords comprises reading the characters in the input image. In yet other aspects, the identifying one or more keywords comprises using relative locations of characters in the 2D space to determine the one or more keywords.

Still other aspects of the invention provide a machine learning system to identify forms, the machine learning system comprising at least one processor and a non-transitory memory that is programmed for the machine learning system to perform a method comprising: receiving a form as an input image; identifying a field in the input image; identifying boundaries of the field; identifying locations of characters in the field; creating a two-dimensional space containing special characters; replacing the special characters with the characters in the field; identifying one or more keywords in the field based on identification of words and/or location of words; and responsive to an indication that the identifying one or more keywords yielded an incorrect result, updating the machine learning system.

According to a further aspect of the machine learning system, updating the machine learning system comprises updating weights of nodes in the machine learning system. In a still further aspect, the input image comprises a synthetic form or an image of a scanned form. In a yet further aspect of the machine learning system, the identifying one or more keywords comprises reading the characters in the input image. In a yet still further aspect, the identifying one or more keywords comprises using relative locations of characters in the 2D space to determine the one or more keywords. In another aspect, the special characters are distinguished from the other characters in the field by being different from the other characters in the field. In yet another aspect of the machine learning system, the method further comprises, responsive to the determining the type of form, determining whether the form requires registration. In still another aspect, the method further comprises, responsive to a determination that the form requires registration, performing registration on the form. In yet still another aspect, the identifying one or more keywords comprises reading the characters in the input image. In yet another further aspect, the identifying one or more keywords comprises using relative locations of characters in the 2D space to determine the one or more keywords.

In accordance with an embodiment, creation of a 2D space to contain characters, words, and/or phrases in a field enables creation of a virtual image that is a character based 2D text space image, in which each character is related to a pixel coordinate in a natural image. This treatment combines low-level geometry information from bounding boxes and high-level semantic information from extracted OICRs. The treatment is similar to that in which a character may be identified, for example, by reference to its eight closest neighboring characters in the 2D space. In this manner, each character may be connected to its neighboring character(s). In an embodiment, the treatment of the 2D image space described here may be similar to treatment with pixels in an image grid.

This just-discussed aspect may be appreciated better with reference to the examples below.

FIG. 1 shows a form with identifiable field sections such as field 110 within bounding box 150. A size of bounding box 150 may be defined in various ways. For example, the four points at the respective corners of bounding box 150 may be identified. As another example, a single (x,y) coordinate may be identified as one corner of the bounding box 150, and the width and height of the bounding box may be provided.

Field 110 contains a number of characters in various known locations. The character locations within field 110 can have significance in identifying what the characters are, or what the field is (for example, an address field), or in reproducing the form, or in matching the form with other forms, or in performing form registration, in which translation, scaling, and/or rotation of an input form may be necessary in order to align the fields correctly with fields in corresponding forms.

Figure 2:
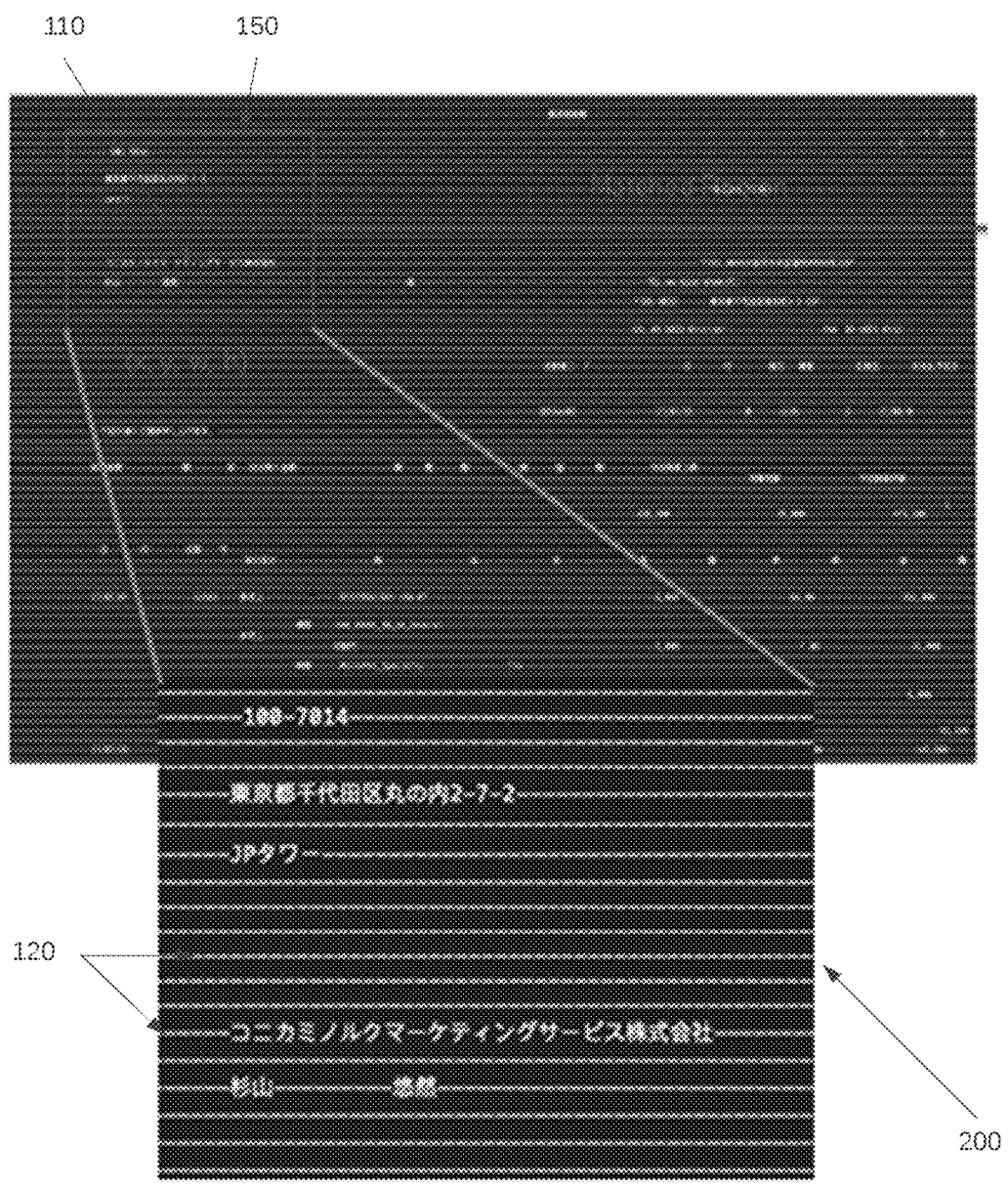
FIG. 2 shows an exploded view of the highlighted field of FIG. 1 in a 2D image space.

FIG. 2 shows field 110 inside bounding box 150 blown up to a 2D space 200, with each character being related to a pixel coordinate in a natural image. Other information from form 100 also is shown, in the creation of a larger 2D space than just 2D space 200, accounting for relative location of other information on form 100.

The 2D space 200 contains not only the characters in field 110, but also special characters 120. In an embodiment, the special characters 120 are not characters that normally appear in the form field being analyzed. In an embodiment, the special characters 120 may be differentiated from characters that normally appear in the form field being analyzed by the location and/or number of special characters 120 in the 2D space 200 relative to location and/or number of other characters in the 2D space 200. In an embodiment, special characters 120 are inserted in pixel locations so as to preserve the relative locations of the characters in field 110. Because the special characters 120 may be differentiated from the characters in field 110, the special characters 120 are not processed.

With such a 2D space, each character in the field being analyzed may be related to a particular pixel coordinate. This relationship facilitates the location of each character relative to other characters in the 2D space, preserving the relative position and orientation of the characters in the original field being analyzed.

By identifying, by pixel coordinate, the location of each character in the field being analyzed, it is possible to take advantage of semantic information about characters in the field in similar forms. In an embodiment, relative location of characters to each other can facilitate character identification on the input form. Where there are long strings of characters, the ability to discern certain characters can facilitate identification of missing or damaged characters.

For example, an address field in a form may have standard information such as company name, street address (possibly a multiple line street address to accommodate building and/or suite numbers), city, state or province, zip or other postal code, and country. In an embodiment, one or more of a telephone number, facsimile number, email address, and website address also may be provided.

A form may have multiple address fields, in different locations. One address field may contain the information about a company, and another address field may contain information about the company's customer. For example, invoices tend to have the selling company's name and information somewhere near the top center of a form, and the customer's name and information somewhere below the selling company's address field, but above the listing of products being sold. Locations of fields in particular areas of a form can facilitate associating particular forms with each other. Identifying specific information such as company information can facilitate matching forms for that particular company. Within those company forms, identifying specific information such as customer identification, even if the locations may be spelled differently or the locations may be different, can facilitate grouping of forms by a particular customer, not only by customer name but also by location.

In an embodiment, if there is an identification of a particular individual in the company or at the company's customer, it is possible to facilitate grouping of forms by that individual.

Where information is missing or damaged in a particular field, it is possible to take advantage of semantic information in that field to repair or compensate for the missing or damaged information, and still group the forms successfully.

In an embodiment, it also is possible to take advantage of semantic information within the field to identify other information that otherwise might be difficult to discern if any of the characters in the field is blurred, smudged, or otherwise damaged. For example, if the city and state/province information is available, it is possible to derive country information, as well as to discern that the zip/postal code will be within a certain range.

Notwithstanding the ability to group forms by location, customer, and the like, one aspect to be appreciated about embodiments of the present invention is that, when a 2D text space image is created, for example, from a field in a form, form matching or registration does not require perfect identification of every character in that field. Relative position of the field on the form, and location of information within that field, can be sufficient. In an embodiment, as little as 30% to 50% of the information present in the field need be identified correctly.

In an embodiment, the 2D input space is a 240 by 180 pixel text 'image' which can cover 240 characters for each line and up to 180 lines in the field or document. The numbers "240" and "180" are merely by way of example. In different embodiments, these numbers may be larger and/or smaller as appropriate to handle the contents of the particular field. In an embodiment, each character or keyword may be embedded as if there were OCR errors as 64 'RGB' feature channels to make the input a 240*180*64 image. One aspect of providing the feature channels is that the channels allow derivation of a more semantic relationship from neighboring characters using a pre-trained natural language processing (NLP) character look-up table or word embeddings.

Figure 3:
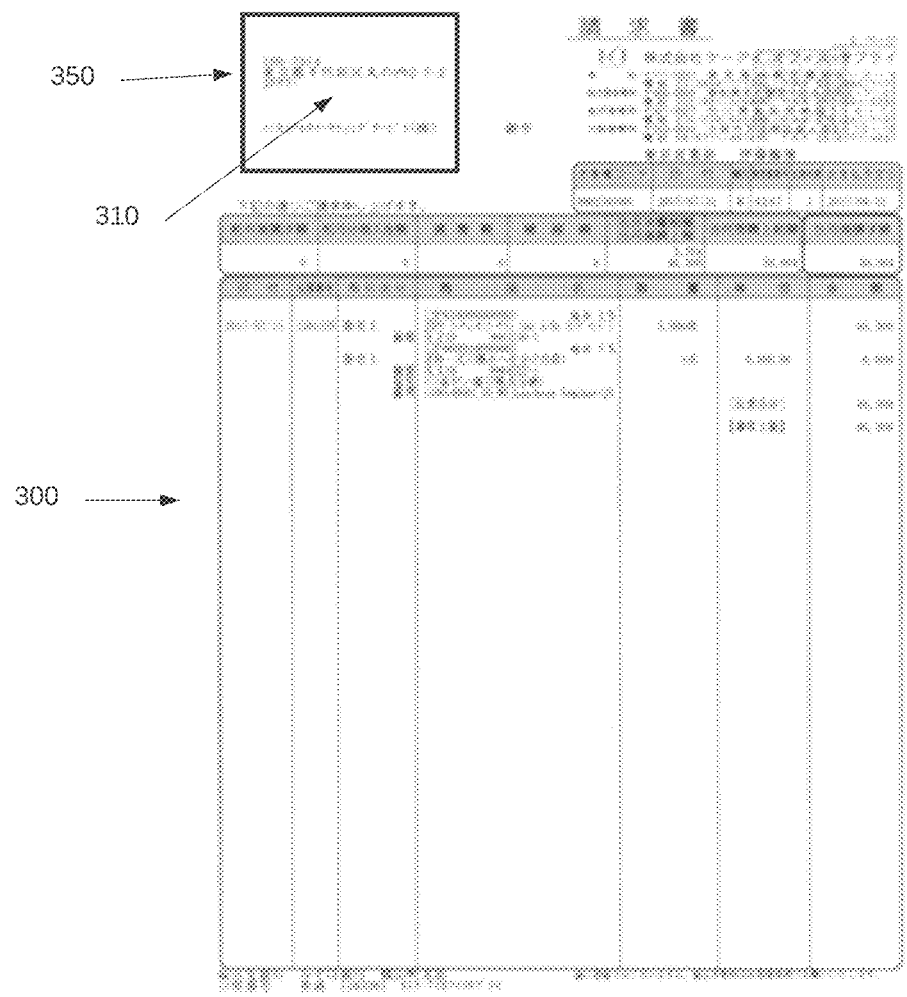
FIG. 3 shows another form with a highlighted field.
Figure 4:
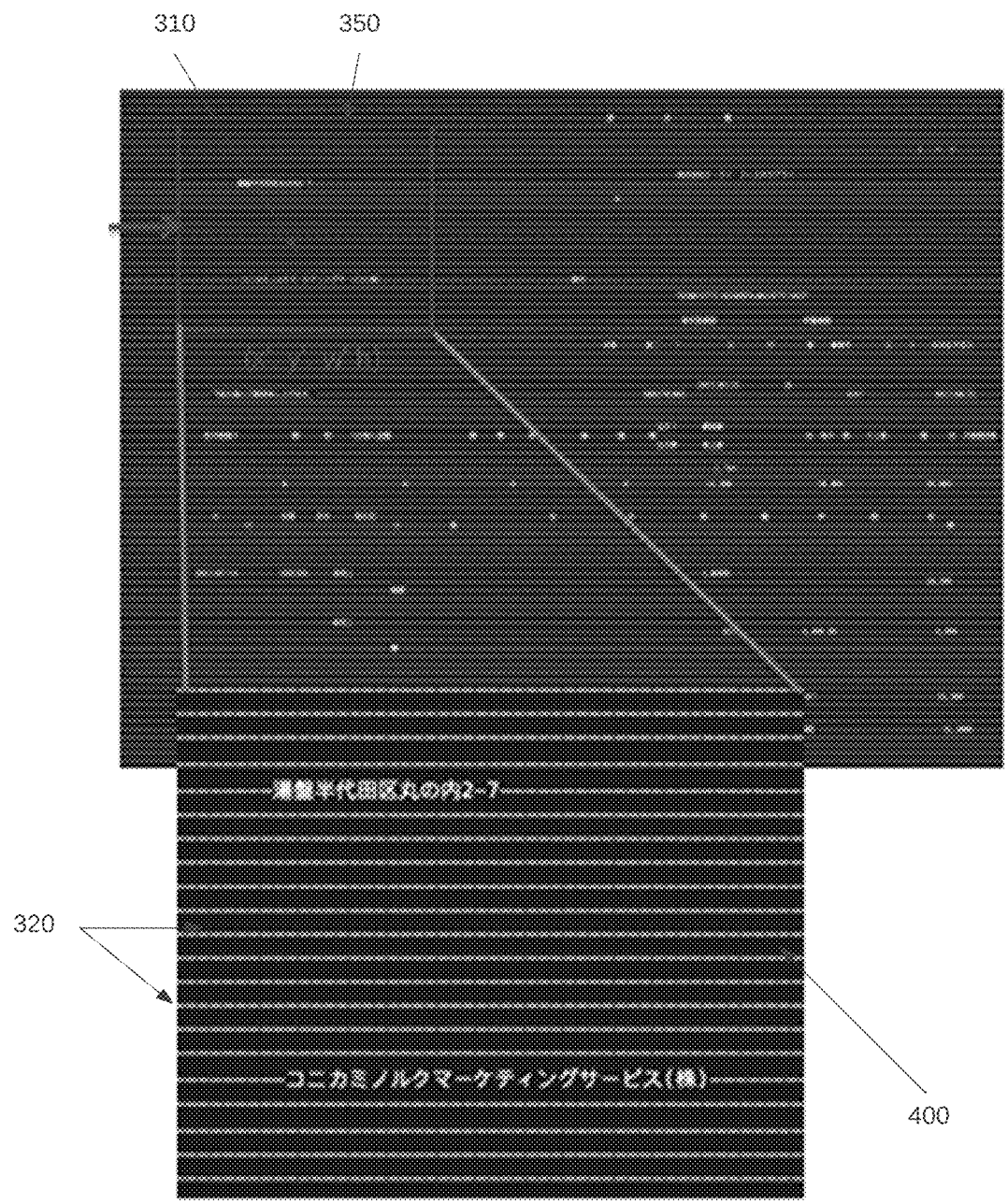
FIG. 4 shows an exploded view of the highlighted field of FIG. 3 in a 2D image space.

FIG. 3 shows another form 300 with a field 310 similar to, but not identical to field 110 in FIG. 1, with a bounding box 350 around the field 310. In FIG. 4, the information in 2D space 400, shows that the information identified in field 310 is different from that identified in field 110 in FIGS. 1 and 2, though the relative locations of the two fields 110, 310 on their respective forms 100, 300 is roughly the same.

To apply the just-described approach in document identification and registration, it is possible to use distance metrics to compute correlations of characters, for example, characters in one or more keywords at given coordinates between documents and find the best match for each keyword. A global keyword consensus then may be employed to find the best matching document. At the same time, within the template and the matched fields, it is possible to localize the paired keywords and their contents to facilitate form registration. This approach is better than matching bounding boxes with text information, because the inventive approach is not affected by scaling or rotation of keywords in the image, or by errors from OCR extraction. With bounding boxes, one keyword or field may be separated by two or more different bounding boxes. Alternatively, a keyword may be cut by two sub-bounding boxes. For example, a field such as "Date of Birth" usually involves one bounding box. However, if the image contains spaces or noise, then it is possible that, after text spotting and OCR, the field could be separated into as many as three bounding boxes, one for each word. When this happens, it can be very challenging to obtain a match with a target keyword or phrase. By considering distance metrics, the spacing/noise issue does not arise.

For purposes of form identification and registration, it should be noted that, unlike other techniques, it is unnecessary to achieve perfect accuracy in reading fields on a form. Discerning relative location of the fields may be sufficient. In an embodiment, discernment of some information in the fields, in different portions of the field (for example, company name and telephone number) may be sufficient to identify the location and boundaries of the field, and to enable forms registration using that field. Ordinarily skilled artisans also will appreciate that the lessened requirement for accuracy in reading means that fewer samples may be necessary to train a system.

Figure 5:
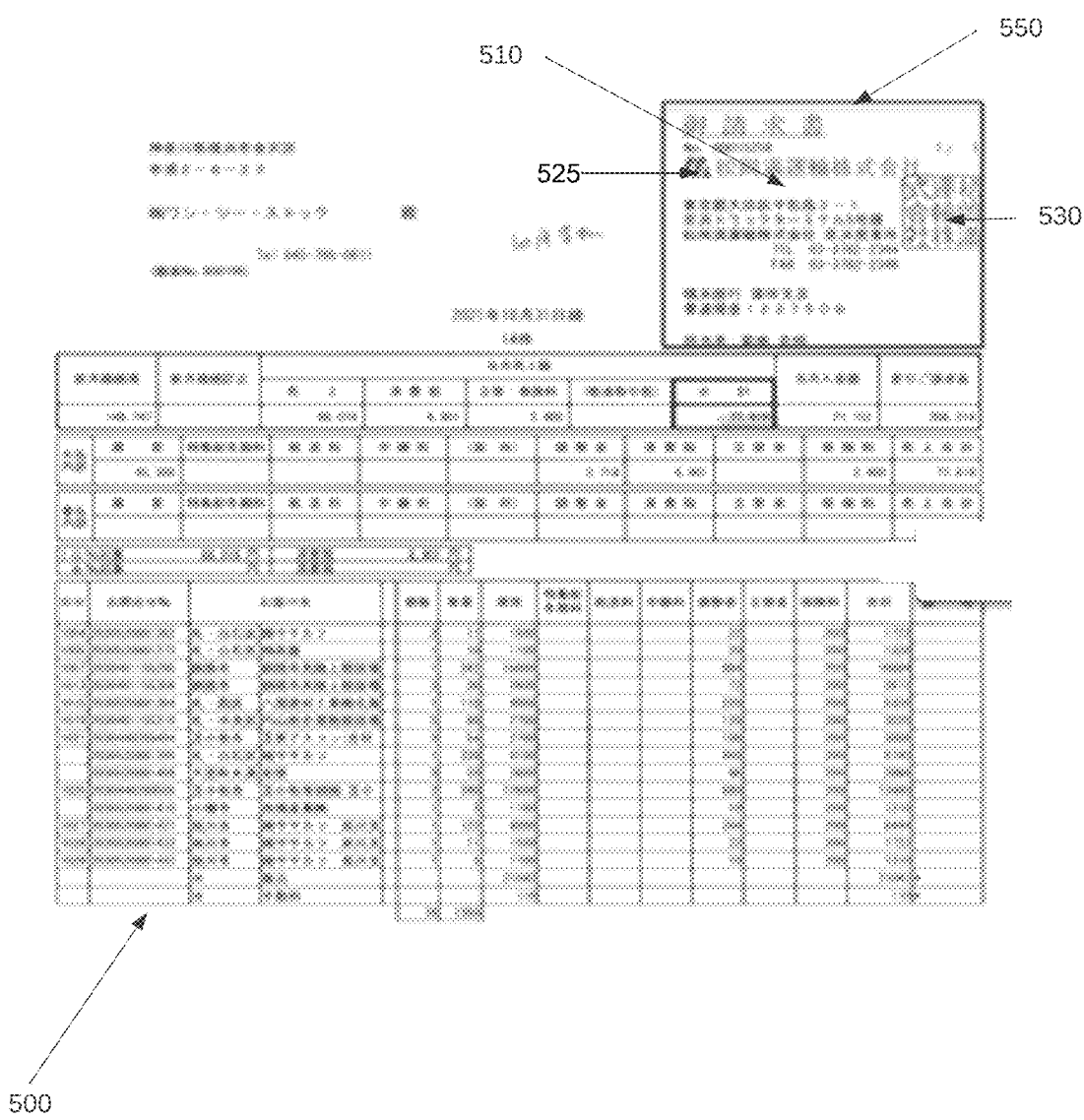
FIG. 5 shows another form with a highlighted field.
Figure 6:
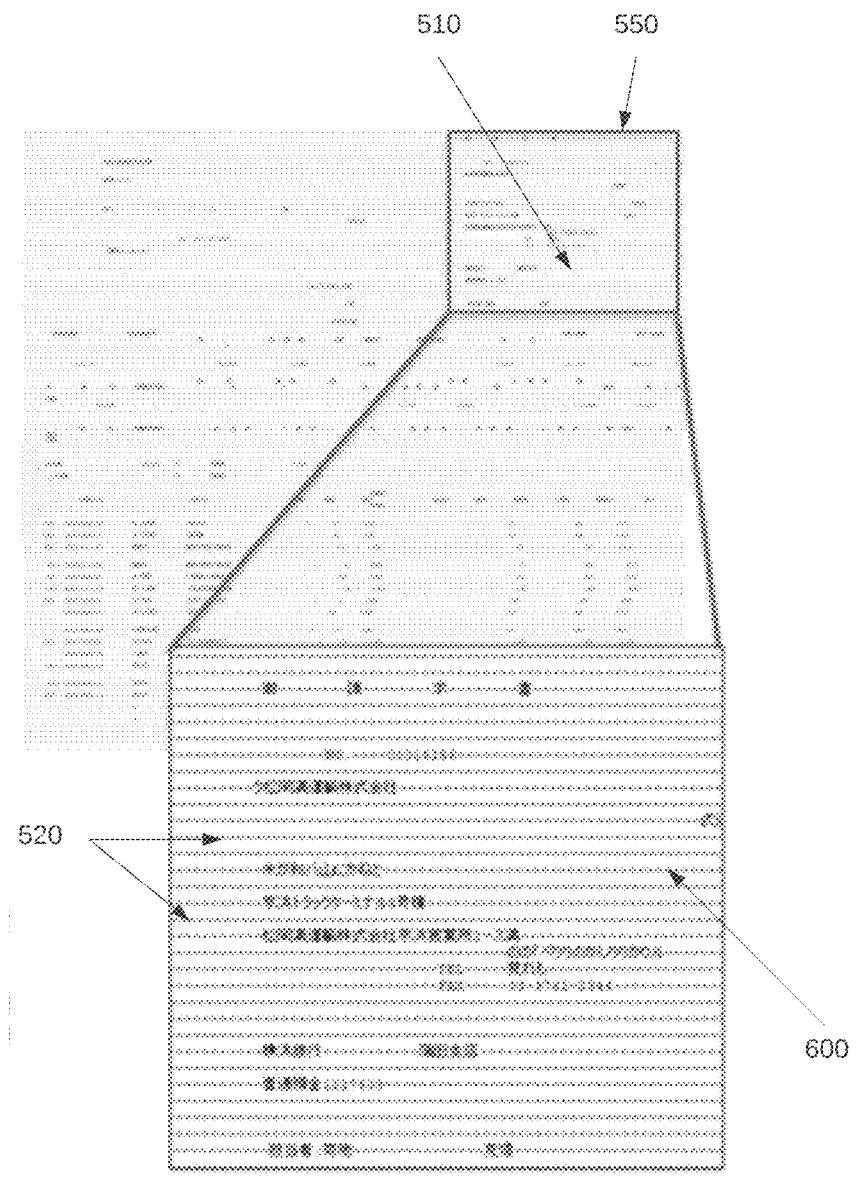
FIG. 6 shows an exploded view of the highlighted field of FIG. 5 in a 2D image space.

Looking at another example, in FIG. 5, in form 500, address field 510 has not only address information, but also a logo 525 and a stamp 530. In an embodiment, as seen in FIG. 6, when creating a 2D field from field 510, the logo 525 and stamp 530 may be omitted. The logo 525 may be part of a completed form, but in an embodiment the logo 525 may not be necessary to the form registration process. In fact, since the same kind of form may be used for various different companies, the logo is less important than the substantive information (company name, address, etc.)

In FIG. 6, 2D field 600 has special characters 520, and shows the relative location of address information within the field 600, without the logo 525 or stamp 530.

Techniques according to aspects of the present invention are not limited to address fields in forms. For example, many forms have a standard amount of space on each page to list orders. Orders generally include products, their quantities, their unit prices, the total price for that product quantity being purchased, a subtotal, a shipping amount, a sales tax amount, and a total. In some instances, products will have descriptions beneath the listing. In many instances, the locations of all of these items—product, quantity, unit price, description, as well as others listed above and still others which will be familiar to ordinarily skilled artisans—can be identified to be standard. Accordingly, a 2D field may be created to cover any or all of these fields. As with the address field discussed in detail above, it may be possible to use semantic information to identify information from these fields that might have been damaged, blurred, missing, or obscured in the OICR process.

Figure 7A:
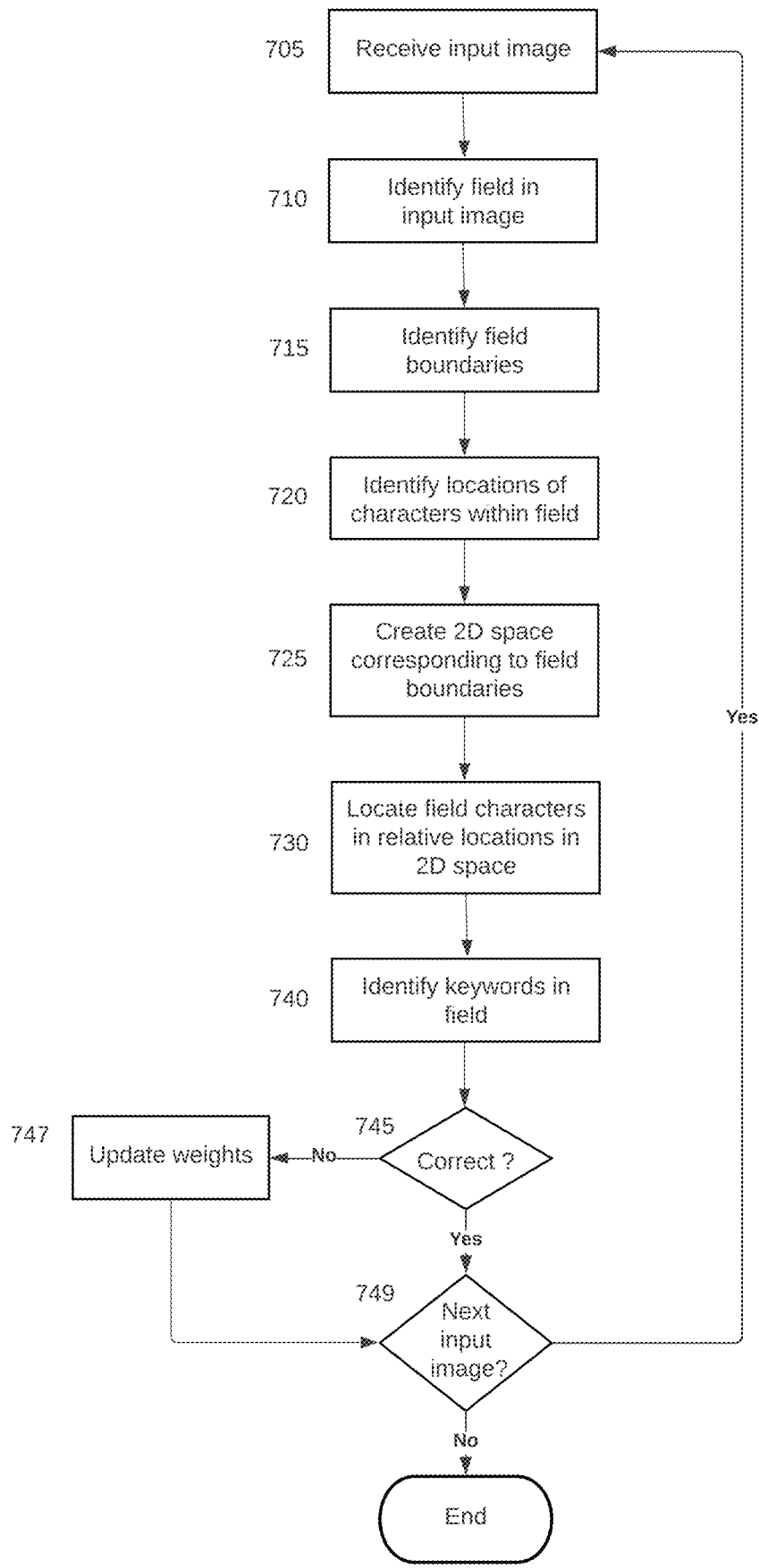
FIG. 7A is a high level flow chart of operations in accordance with an embodiment.

FIG. 7A is a high level flow chart outlining a training operation according to an embodiment. At 705, the system receives an input image. Depending on the embodiment, the image may be a scanned image, or it may be a synthetically generated image. At 710, the input image is analyzed to identify a field. At 715, boundaries of that field are identified. At 720, characters within that field are located.

At 725, a 2D space is created, corresponding to the field boundaries and containing special characters (distinguishable, for example, by type and/or location from the characters in the field). At 730, field characters are located in their relative locations in the 2D space, replacing the special characters where necessary.

At 740, keywords are identified in the field. In an embodiment, this may be done by identifying characters. In an embodiment, this also may be done by identifying relative location of the characters to other characters in a word, or to other characters in the field. For example, for a field containing address information, any or all of the following information may be identified: company name, address, (including any or all of street address, suite address, city, state or province, and country), and other identifying information (telephone number, email address, website address).

At 745, a check is made to see whether the keyword identification is correct. If so, at 749 a check is made to see if there are additional input images for training. If so, the process returns to 705. If not, the process ends.

If the keyword identification is not correct, at 747 the machine learning system is updated, for example, by updating weights of nodes in a neural network. Flow then proceeds to 749, at which a check is made to see if there are additional input images for training. If so, the process returns to 705. If not, the process ends.

Figure 7B:
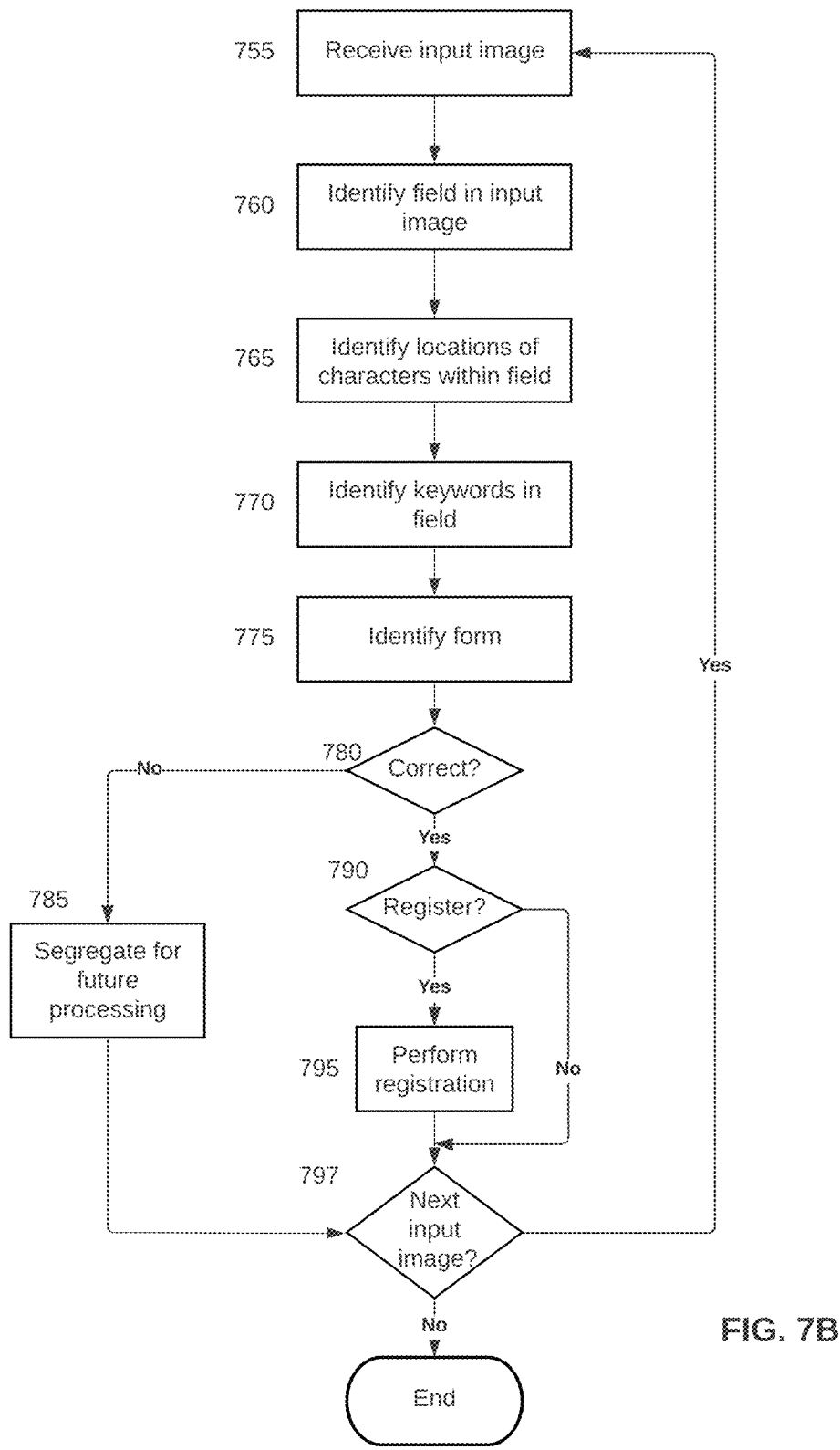
FIG. 7B is a high level flow chart of operations in accordance with an embodiment.

FIG. 7B is a high level flow chart outlining a matching operation according to an embodiment. At 755, an input image is received. This image will be a form to be identified and, if necessary, registered. At 760, a field is identified in the input image. At 765, locations of characters in the field are identified. At 770, keywords in the field are identified. In an embodiment, this may be carried out by reading the keywords themselves. In an embodiment, this may be carried out by identifying characters in the keywords, either relative to positions of other characters in the keywords, or relative to positions of other characters in other keywords.

At 775, the form is identified. At 780, if the identification is correct, at 790 a determination is made whether it is necessary to perform registration on the form. If necessary, at 795 registration is performed. At 797 a determination is made whether there is a next input image to be processed. If so, flow returns to 755. If not, the process ends.

If the identification is not correct, at 785 the form is segregated for future processing. Such future processing may take numerous forms. By way of non-limiting example, the form may be used in future training. Additionally or alternatively, the form may be processed manually. At 790 a determination is made whether it is necessary to perform registration on the form. If necessary, at 795 registration is performed. At 797 a determination is made whether there is a next input image to be processed. If so, flow returns to 755. If not, the process ends.

Figure 8:
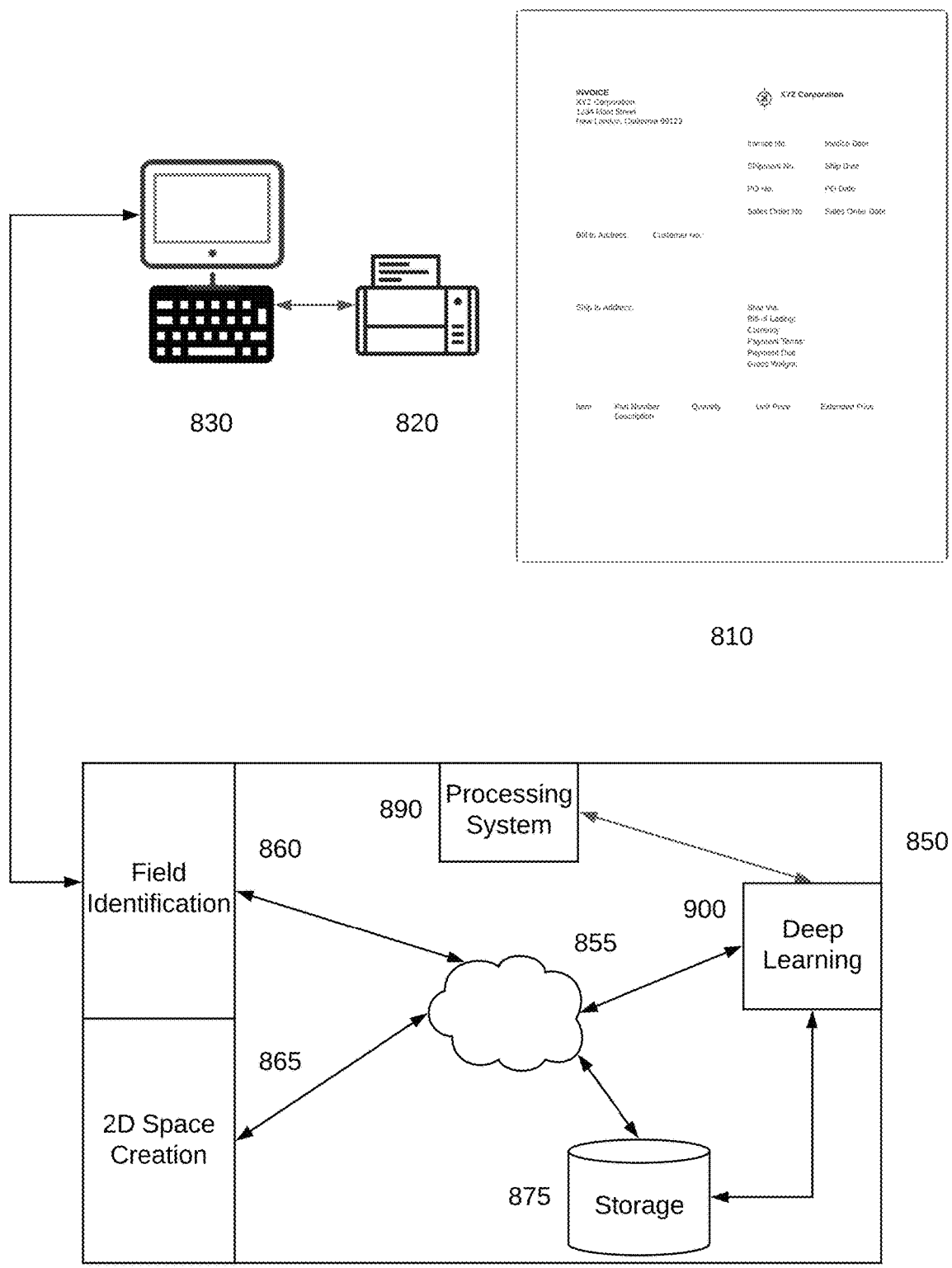
FIG. 8 is a high level block diagram of a system for implementing aspects of the present invention according to an embodiment.

In FIG. 8, to train deep learning system 900, computing system 850 may receive scanned forms by scanning documents 810 using scanner 820, via computer 830. Alternatively, computing system 850 may employ synthetically generated training forms, as ordinarily skilled artisans will appreciate. Computing system 850 may identify fields in the scanned or synthetically generated training forms via field identification section 860. In an embodiment, particularly in the case of scanned forms, field identification section 860 also may generate bounding boxes around identified fields. In a synthetically generated training form, it may be expected that text will be in predictable locations. Nevertheless, in an embodiment it may be desirable to generate the bounding boxes so that coordinates for location of keywords and values may be determined more accurately. Additionally, if images rather than synthetically generated training forms are used in training, irregularity in location of keywords and values may be more likely, making it more desirable to provide bounding boxes around the keywords and values.

In an embodiment, computing system 850 may include a 2D space creation section 865 to convert identified fields into 2D spaces as described previously. In an embodiment, storage 875 may store the scanned images or synthetically generated training forms that deep learning system 900 processes. Storage 875 also may store training sets, and/or the processed output of deep learning system 900, which may include identified keywords.

Computing system 850 may be in a single location, with network 855 enabling communication among the various elements in computing system 850. Additionally or alternatively, one or more portions of computing system 850 may be remote from other portions, in which case network 855 may signify a cloud system for communication. In an embodiment, even where the various elements are co-located, network 655 may be a cloud-based system.

Additionally or alternatively, processing system 890, which may contain one or more of the processors, storage systems, and memory systems referenced above, may implement regression algorithms or other appropriate processing to resolve locations for keywords. In an embodiment, processing system 890 communicates with deep learning system 900 to assist, for example, with weighting of nodes in the system 900.

Figure 9:
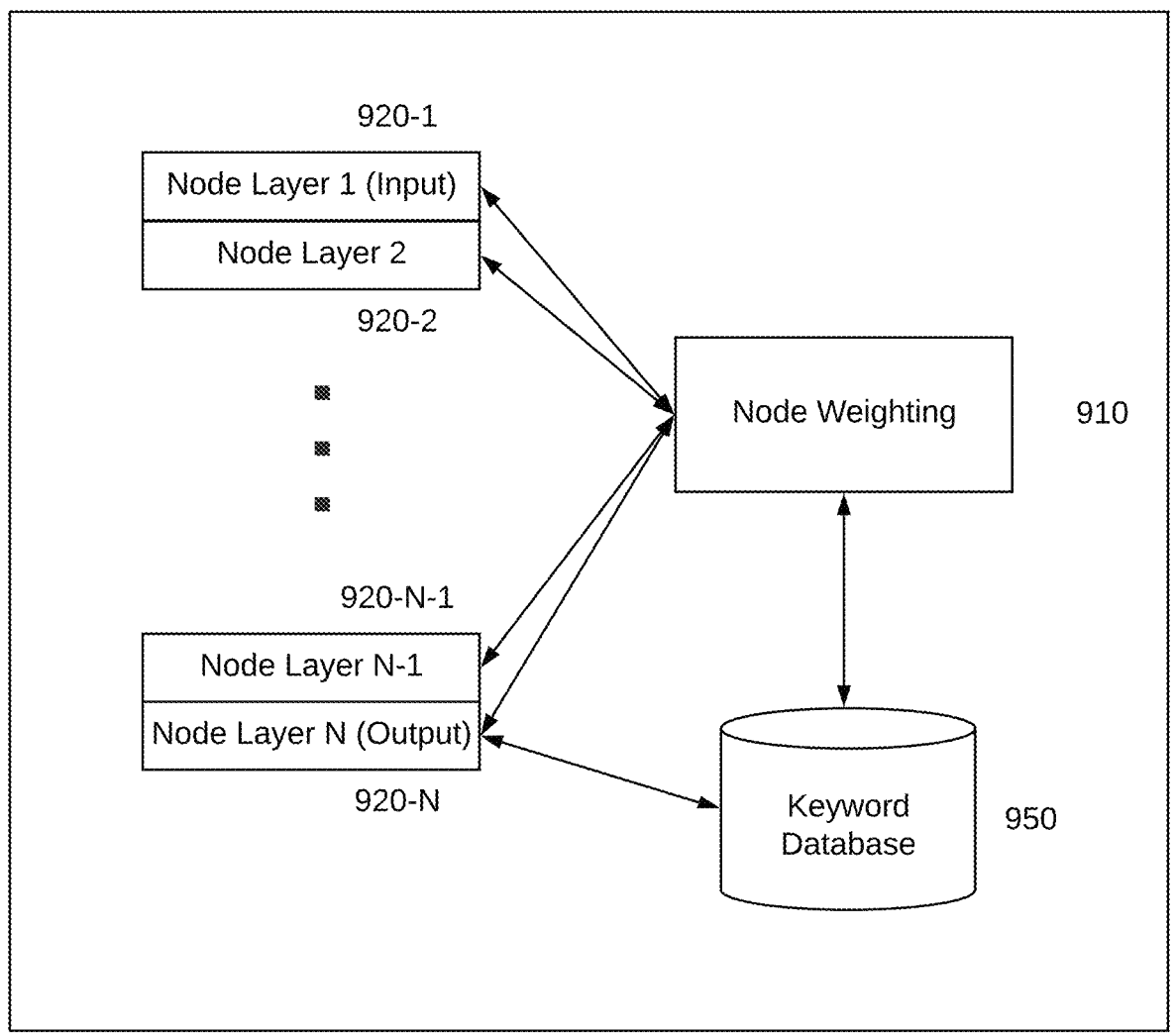
FIG. 9 is a high level block diagram of a deep learning module according to an embodiment.

FIG. 9 shows a slightly more detailed diagram of deep learning system 900. Generally, deep learning system 900 will have processor, storage, and memory structure that ordinarily skilled artisans will recognize. In an embodiment, the processor structure in deep learning system 900 may include graphics processing units (GPU) as well as or instead of central processing units (CPU), as there are instances in which neural networks run better and/or faster and/or more efficiently on one or more GPUs than on one or more CPUs. A neural network, such as a convolutional neural network (CNN) or a deep convolutional neural network (DCNN), will have a plurality of nodes arranged in layers 920-1 to 920-N as depicted. Layer 920-1 will be an input layer, and layer 920-N will be an output layer. According to different embodiments, N can be two or greater. If N is three or greater, there will be at least one hidden layer (for example, layer 920-2). If N equals two, there will be no hidden layer.

There will be initial weightings provided to the nodes in the neural network. The weightings are adjusted, as ordinarily skilled artisans will appreciate, as modifications are necessary to accommodate the different situations that a training set will present to the system. As the system 900 identifies keywords, the output layer 920-N may provide the keywords to a keyword database 950. The database 950 also may store classifications of forms, with accompanying location of keywords and, where applicable, location of value relative to the keywords.

Ordinarily skilled artisans will appreciate that different types of neural networks may be employed as appropriate, and that various functions may be performed by different ones of elements 860, 865, and 890 in FIG. 8, depending on the function to be performed and the resulting efficiency of dividing operations among different processors/GPUs/CPUs in the overall system.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A computer-implemented method of training a machine learning system to identify forms in document and form analysis, the method comprising:
 a) receiving a form as an input image;
 b) identifying a field in the input image;
 c) identifying boundaries of the field;
 d) identifying locations of characters in the field;
 e) creating a two-dimensional space as a blown up representation of the field, the two-dimensional space containing special characters, the special characters being different from the characters in the field, the special characters being inserted in pixel locations so as to preserve the locations of the characters in the field;
 f) replacing the special characters in the two-dimensional space with the characters in the field, the characters being positioned in locations in the two-dimensional space corresponding to the locations of the characters in the field, each character being related to a pixel location;
 g) identifying one or more keywords in the field based on identification of words and/or location of words, wherein a) to g) enable form matching for the document and form analysis; and
 h) responsive to an indication that the identifying one or more keywords yielded an incorrect result, updating the machine learning system.

2. The method of claim 1, wherein updating the machine learning system comprises updating weights of nodes in the machine learning system.

3. The method of claim 1, wherein the input image comprises a synthetic form or an image of a scanned form.

4. The method of claim 1, wherein the identifying one or more keywords comprises reading the characters in the input image.

5. The method of claim 1, wherein the identifying one or more keywords comprises using relative locations of characters in the 2D space to determine the one or more keywords.

6. The method of claim 1, further comprising, responsive to a determination that there are more forms to be processed, receiving the next form and repeating the method.

7. A machine learning system to identify forms in document and form analysis, the machine learning system comprising at least one processor and a non-transitory memory that is programmed for the machine learning system to perform a method of document and form analysis comprising:
- a) receiving a form as an input image;
- b) identifying a field in the input image;
- c) identifying boundaries of the field;
- d) identifying locations of characters in the field;
- e) creating a two-dimensional space as a blown up representation of the field, the two-dimensional space containing special characters, the special characters being different from the characters in the field, the special characters being inserted in pixel locations so as to preserve the locations of the characters in the field;
- f) replacing the special characters in the two-dimensional space with the characters in the field, the characters being positioned in locations in the two-dimensional space corresponding to the locations of the characters in the field, each character being related to a pixel location;
- g) identifying one or more keywords in the field based on identification of words and/or location of words, wherein a) to g) enable form matching for the document and form analysis; and
- h) responsive to an indication that the identifying one or more keywords yielded an incorrect result, updating the machine learning system.

8. The system of claim 7, wherein updating the machine learning system comprises updating weights of nodes in the machine learning system.

9. The system of claim 7, wherein the input image comprises a synthetic form or an image of a scanned form.

10. The system of claim 7, wherein the identifying one or more keywords comprises reading the characters in the input image.

11. The system of claim 7, wherein the identifying one or more keywords comprises using relative locations of characters in the 2D space to determine the one or more keywords.

12. The system of claim 7, further comprising:
responsive to the identifying the one or more keywords, determining a type of the form.

13. The system of claim 12, further comprising, responsive to the responsive to the determining the type of form, determining whether the form requires registration.

14. The system of claim 7, further comprising, responsive to a determination that there are more forms to be processed, receiving the next form and repeating the method.

15. The system of claim 13, wherein, responsive to the determination that the form requires registration, performing registration on the form.

* * * * *